US012167780B1

(12) United States Patent
Atlas et al.

(10) Patent No.: US 12,167,780 B1
(45) Date of Patent: Dec. 17, 2024

(54) INTERACTIVE NECKLACE WITH USER CONDITION SENSING

(71) Applicant: Meta Platforms Technologies, LLC, Menlo Park, CA (US)

(72) Inventors: Charlene Mary Atlas, Redmond, WA (US); Nadine Sharon Anglin, Los Angeles, CA (US); Auset Parris, Oakland, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 70 days.

(21) Appl. No.: 18/068,950

(22) Filed: Dec. 20, 2022

(51) Int. Cl.
| | |
|---|---|
| *A44C 15/00* | (2006.01) |
| *G06F 1/16* | (2006.01) |
| *G06F 3/01* | (2006.01) |
| *H04W 4/12* | (2009.01) |

(52) U.S. Cl.
CPC ............ *A44C 15/005* (2013.01); *G06F 1/163* (2013.01); *G06F 3/012* (2013.01); *H04W 4/12* (2013.01)

(58) Field of Classification Search
None
See application file for complete search history.

(56) References Cited

U.S. PATENT DOCUMENTS

| | | | | |
|---|---|---|---|---|
| 11,012,122 | B1* | 5/2021 | Beg | H04L 25/0212 |
| 11,304,254 | B2* | 4/2022 | Omer | H04W 76/15 |
| 2019/0290134 | A1* | 9/2019 | Banet | A61B 5/318 |
| 2019/0382007 | A1* | 12/2019 | Casas | G06V 10/764 |
| 2020/0175405 | A1* | 6/2020 | Omer | G06F 17/16 |
| 2023/0077010 | A1* | 3/2023 | Zhang | G06V 40/171 |

\* cited by examiner

*Primary Examiner* — Fekadeselassie Girma
(74) *Attorney, Agent, or Firm* — Potomac Law Group, PLLC; Dannon G. Allbee

(57) ABSTRACT

A necklace manager of an interactive necklace can sense user conditions and transmit messages to recipient computing devices. The necklace manager can compare sensed user conditions from the interactive necklace sensors to predefined user condition templates to determine a match. The matching predefined user condition template can be mapped to a user intent. The necklace manager can, in response to mapping the sensed user conditions to the user intent, transmit a message to a recipient device that is based on the mapped user intent and a user identifier. In some implementations, the recipient device can be an other interactive necklace that performs a mapped interactive necklace action in response to the received message. For example, a wearer of the recipient interactive necklace can perceive sentiments, emotions, and/or reactions from a user wearing the originating interactive necklace by perceiving interactive necklace actions triggered by the received message.

20 Claims, 9 Drawing Sheets

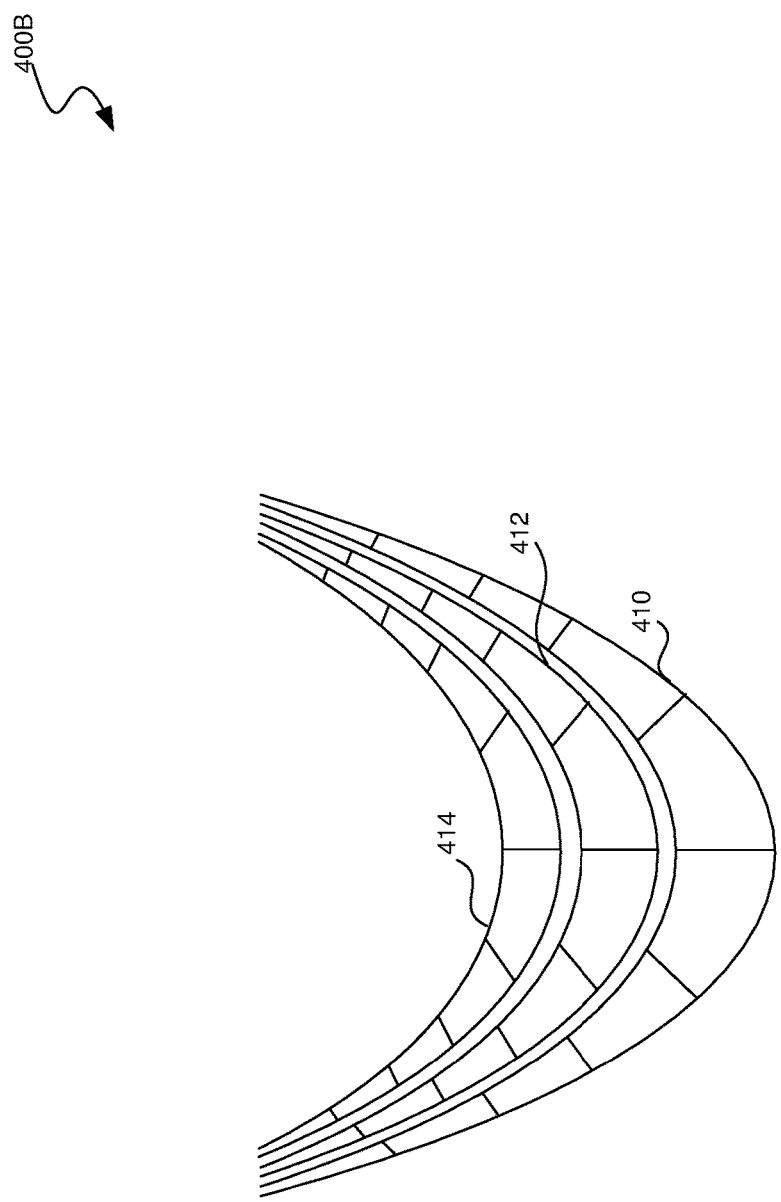

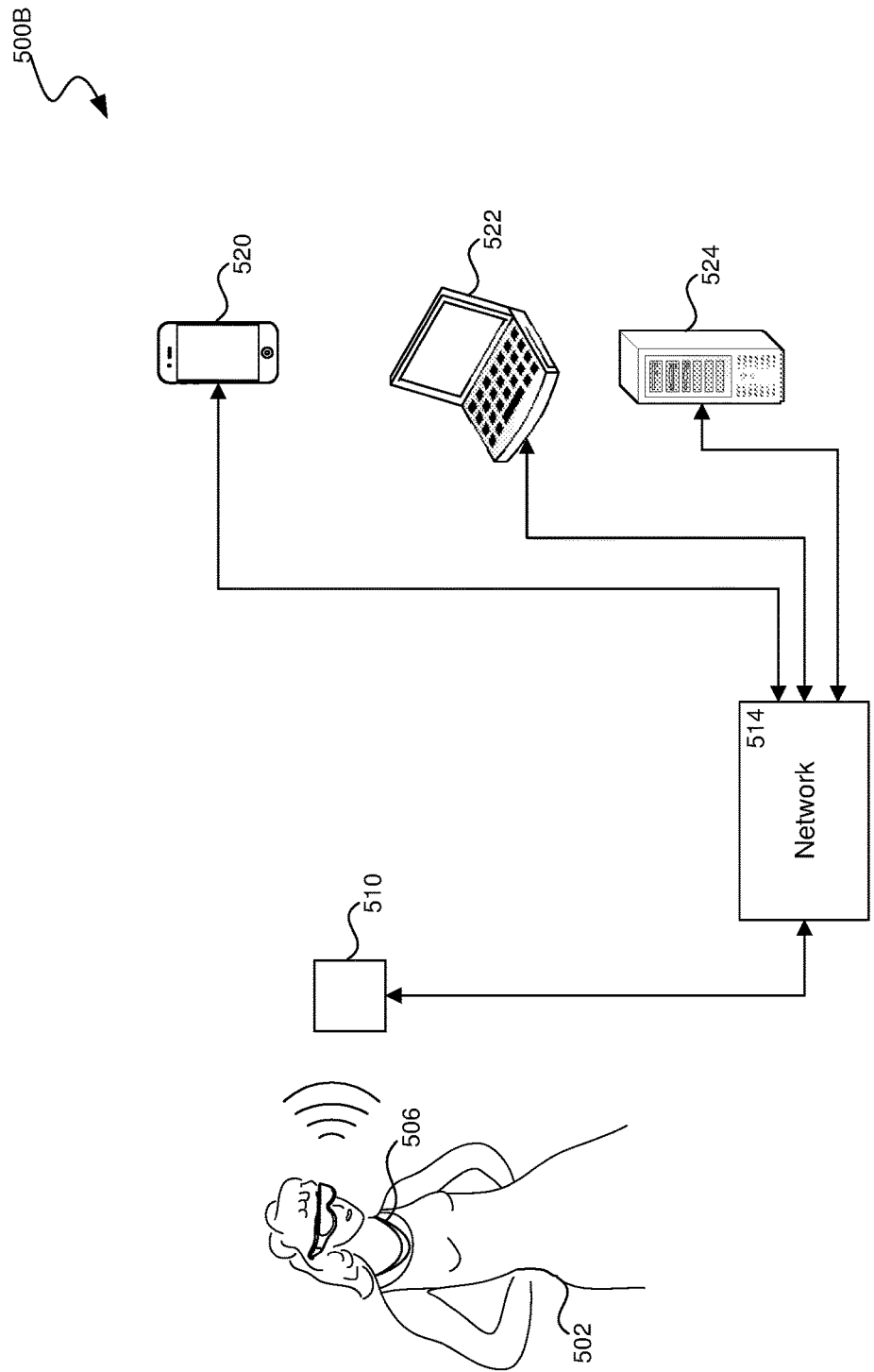

US 12,167,780 B1

INTERACTIVE NECKLACE WITH USER CONDITION SENSING

TECHNICAL FIELD

The present disclosure is directed to an interactive necklace with user condition sensing that supports user interactivity.

BACKGROUND

Network connected devices have grown in popularity, such as Internet of Things ("IoT") devices, fitness trackers, and smartwatches. Such devices can enhance a user's connectivity. For example, a smartwatch can display a text message to a user or an IoT device can provide the user weather information, record user utterances for social media, or add items to the user's grocery list. Some connected devices can sense user conditions when worn by the user, such as steps, pulse, and sleep activity. However, conventional connected devices are limited in the manner they can be worn (e.g., around the wrist) and the user conditions sensed by these conventional connected devices are both limited in scope and fail to convey deeper user sentiments.

BRIEF DESCRIPTION OF THE DRAWINGS

FIG. 4B is conceptual diagram of a multi-tier interactive necklace.

FIG. 5B is a diagram illustrating components of a system for communication between an interactive necklace and an other computing device.

The techniques introduced here may be better understood by referring to the following Detailed Description in conjunction with the accompanying drawings, in which like reference numerals indicate identical or functionally similar elements.

DETAILED DESCRIPTION

Figure 1:
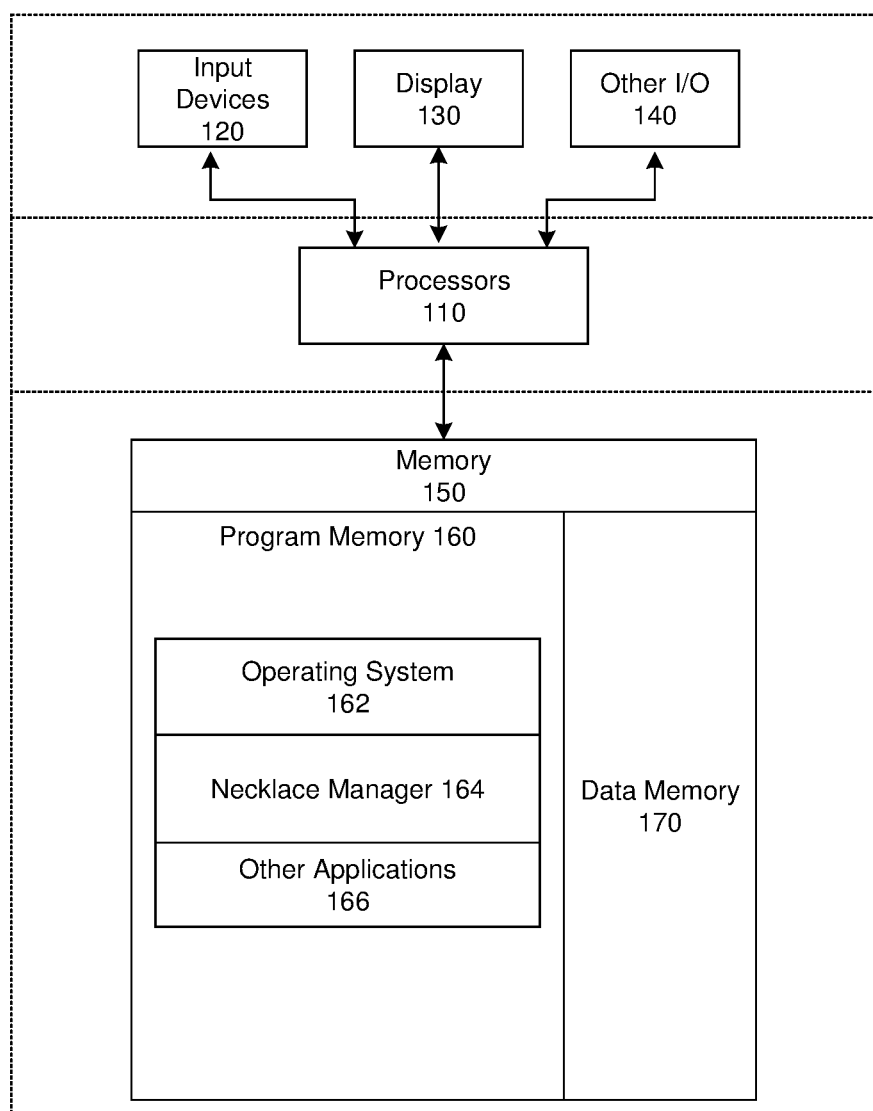
FIG. 1 is a block diagram illustrating an overview of devices on which some implementations can operate.

Aspects of the present disclosure are directed to sensing user conditions via an interactive necklace that supports user interactivity. Implementations of the interactive necklace can include sensors that sense the necklace wearer's conditions (e.g., user conditions), such as movements, body positioning, body temperature, and the like. A necklace manager can compare use conditions sensed via the sensors to predefined user condition templates. For example, the predefined user condition templates can represent distinct user behaviors, such as user movements (e.g., head movements, shoulder movements, chest movements, etc.), user body position (e.g., head position, gaze, posture, etc.), user actions (e.g., laughing, crying, etc.), and other suitable user behavior. In some implementations, the user condition templates can be defined by sensor data value ranges or thresholds, body position (e.g., head position, posture), or other suitable definitions.

The predefined user condition templates can be mapped to user intents. User intents can include user sentiments, emotions, responses, or other suitable user intentions. For example, a predefined user condition template that corresponds to a laughing action for a user can be mapped to user intents such as laughing, smiling, entertained, and the like. In some implementations, the necklace manager can compare sensed user conditions to the predefined user templates to determine templates that match. The sensed user conditions can then be mapped to the user intent for the matching template. For example, when the sensed user conditions match a predefined user condition template that corresponds to a laughing action from a user, the mapped user intent can comprise laughing, smiling, entertained, etc.

In response to the mapped user intent, implementations of the necklace manager can transmit a message to a recipient device (e.g., another interactive necklace, or any other suitable recipient device). For example, the message can comprise an identifier for the wearer of the necklace (e.g., user identifier), the mapped user intent, and any other suitable user information. In some implementations, the recipient device can be an other interactive necklace that performs an action in response to the received message.

For example, the other interactive necklace can store predefined mappings between user intents and interactive necklace actions. Example interactive necklace actions include: actuating one or more necklace components, actuating patterns of one or more necklace components, emitting light from one or more necklace components, emitting light patterns from one or more necklace components, other suitable necklace actions, or any combination thereof. The other interactive necklace can then perform the mapped interactive necklace action, and the wearer of the other interactive necklace can perceive the performed action. For example, users may learn to understand interactive necklace actions as user intended sentiments, emotions, responses, messages, or other suitable communication. In some implementations, the wearer of the originating interactive necklace can communicate, to the wearer of the recipient interactive necklace, sentiments, emotions, responses, messages, etc. via user conditions sensed by the origination interactive necklace, a triggered message transmission, and a performed interactive necklace action that is perceived by the wearer of the recipient interactive necklace.

In some implementations, the recipient device(s) that receive the message from the originating interactive necklace can be other suitable computing device(s), such as a smartwatch, fitness tracker, laptop, IoT device, artificial reality system, server, smartphone, smart home device, any other suitable computing device, or any combination thereof. These recipient devices can also store predefined mappings between user information (e.g., user intents, user identifiers, etc.) and recipient device actions. In some implementations, the recipient device(s) can then perform the mapped action in response to receiving the message. Example mobile device (e.g., smartphone, smartwatch, etc.) actions include inserting a sentiment indicator (e.g., emoticon, reaction indicator, etc.) in a text dialogue (e.g., text message, chat application, social media application, etc.) for the user identified in the received message, changing an expression on an avatar for/representation of the user identified in the received message, adding an expression indicator (e.g., emoticon) to an avatar for/representation of the user identified in the received message, and other suitable mobile device actions.

Example server (e.g., cloud server, data center server, etc.) actions include changing an expression on an avatar for/representation of the user identified in the received message, adding an expression indicator to an avatar for/representation of the user identified in the received message, adjusting artificial reality environment parameters displayed to the user identified in the received message (e.g., reducing display clutter, moving the user into a different location in an artificial reality environment, removing the user from the artificial reality environment, etc.), and other suitable server actions. Example other computing device (e.g., artificial reality system, IoT device, smart home device, edge device, etc.) actions include generating audio representative of the user intent communicated by the user identified in the received message (e.g., predefined sound, predefined voice reciting predefined words, etc.), changing an expression on an avatar for/representation of the user identified in the received message, adding an expression indicator to an avatar for/representation of the user identified in the received message, adjusting environment parameters for the user identified in the received message, (e.g., a room temperature, lighting, sound level, etc.), and other suitable computing device actions.

In some implementations, the interactive necklace manager determines a set of recipient devices for the message triggered by the sensed user conditions. In some implementations, a set of permitted users/computing devices can be explicitly defined by a user (e.g., the user wearing the originating interactive necklace). In another example, a representation of the user can be present in an artificial reality environment, and users (and their devices) within a proximity distance (e.g., distance threshold) from the representation of the user in the artificial reality environment can be selected for messaging. In another example, users (and their devices) that participate in an application or shared session with the user (e.g., virtual reality meeting, video meeting, holographic meeting, audio, video, or holographic call, etc.) can be selected for messaging.

Some conventional connected devices can sense user conditions when worn by a user, such as steps, pulse, and sleep activity. However, conventional connected devices are limited in the manner they can be worn (e.g., around the wrist) and the user conditions sensed by these conventional connected devices are both limited in scope and fail to convey deeper user sentiments. Implementations leverage sensor data, predefined user condition templates, and predefined user intents to recognize user intents that represent sentiments, emotions, and/or reactions. These recognized user intents can be communicated to other users via messages to recipient computing devices. For example, a wearer of a recipient interactive necklace can perceive the sentiments, emotions, and/or reactions from a user wearing the originating interactive necklace by perceiving interactive necklace actions triggered by the received messages. These communicated sentiments, emotions, and/or reactions achieve a level of user interactivity and connectedness that conventional connected devices cannot.

Implementations also leverage a wearable device that is worn around the neck as a necklace rather than around the wrist as a smartwatch or fitness tracker. The interactive necklace can therefore sense user conditions via sensor locations that are distinct from those comprised on conventional connected devices. The sensor locations achieved by implementations of the interactive necklace can sense new and/or diverse user conditions and improve the recognition of user intention.

Several implementations are discussed below in more detail in reference to the figures. FIG. 1 is a block diagram illustrating an overview of devices on which some implementations of the disclosed technology can operate. The devices can comprise hardware components of a device 100 that sense user conditions via an interactive necklace to support user interactivity. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, necklace manager 164, and other application programs 166. Memory 150 can also include data memory 170, e.g., user condition templates, user intent mappings, sensor data value range(s) or thresholds, device action mappings, application action mappings, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
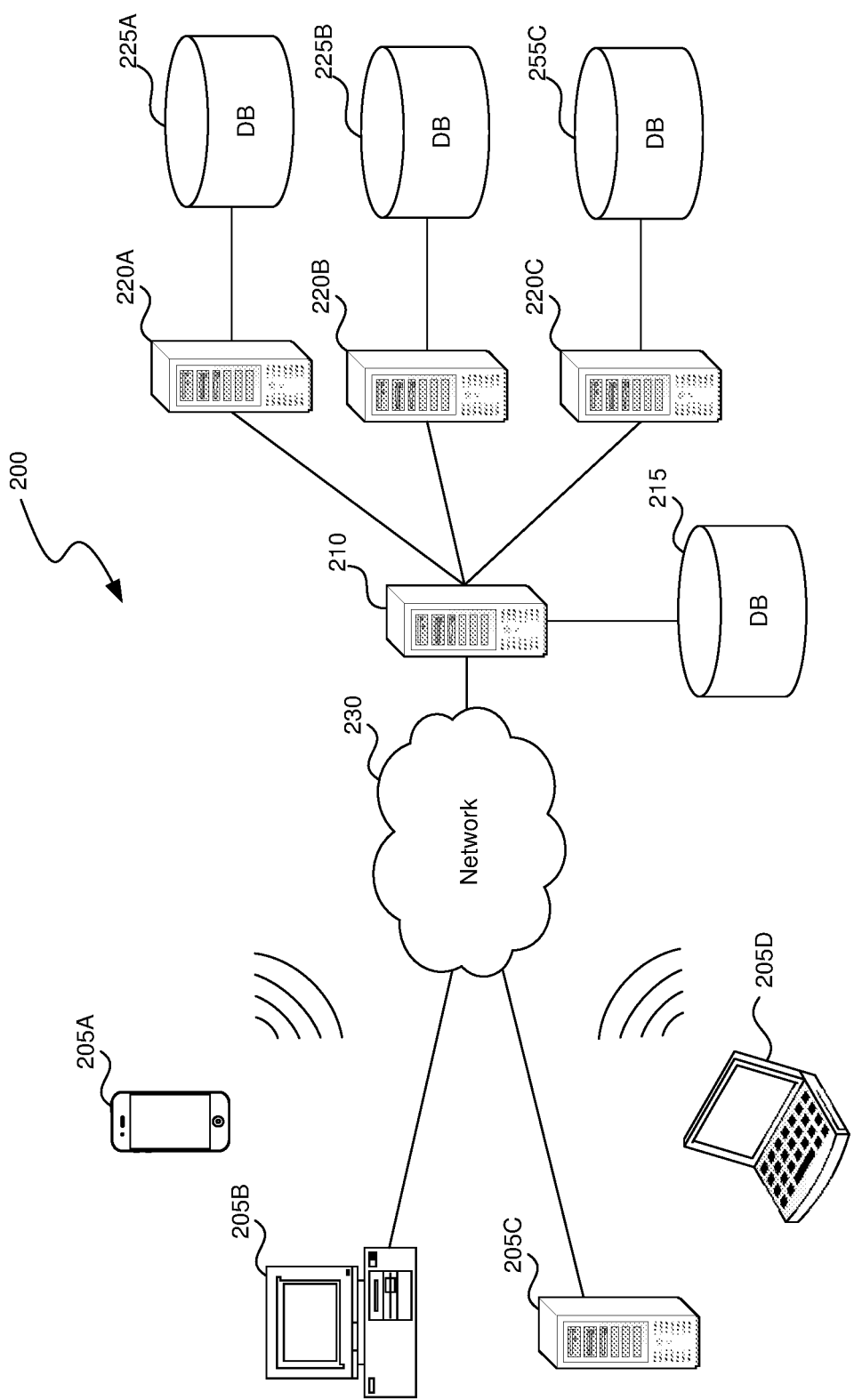
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as user condition templates, user intent mappings, sensor data value range(s) or thresholds, device action mappings, and/or application action mappings. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
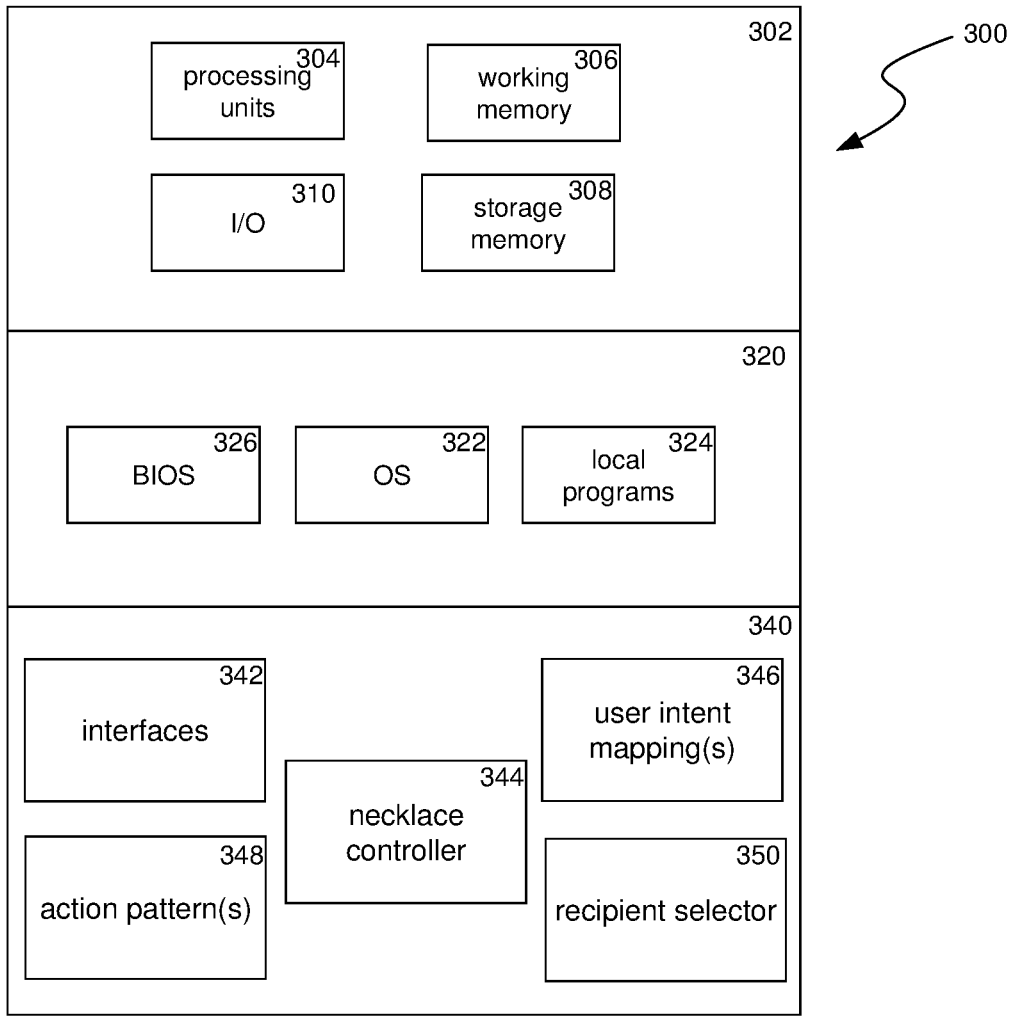
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include necklace controller 344, user intent mapping(s) 346, action pattern(s) 348, recipient selector 350, machine learning model(s) 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Necklace controller 344 can perform the software functionality of interactive necklace implementations. For example, necklace controller 344 can send instructions to sensor(s) and receive sensor data, perform logic to match sensed user conditions to user intent mappings 346, generate messages for recipient devices, and send and receive data (e.g., messages) to/from wireless communication component(s) of the interactive necklace. In some implementations, necklace controller 344 can, in response to receiving a message from an originating computing device (e.g., via the wireless communication component(s)), match the message contents to one or more action profile(s) 348, and instruct action component(s) of the interactive necklace to perform actions according to the action profile(s). Descriptions with references to FIGS. 4A, 4B, 5A, 5B, 6, and 7 further describe the functionality of necklace controller 344.

User intent mapping(s) 346 can be predefined mappings between user condition templates and user intents. For example, user condition templates can comprise sensor data value ranges, thresholds, user states (e.g., head position), or any other definitions for sensed use conditions. In some implementations, necklace controller 344 can determine when sensed user conditions match one or more user condition templates. The user condition templates of user intent mapping(s) 346 comprise mapped user intents, such as user sentiment, emotion, reaction, response, or any other suitable user intent. In some implementations, necklace controller 344 can compare sensed user conditions to the user condition templates/mapped user intents of user intent mapping(s) 346 to determine a user intent intended by the sensed user conditions. Based on the user intent determined by the comparison(s), necklace controller 344 can generate and transmit a message to recipient device(s). Descriptions with references to FIGS. 4A, 4B, 5A, 5B, 6, and 7 further describe the functionality of user intent mapping(s) 346.

Action profile(s) 348 can store mappings between interactive necklace actions and user information (e.g., user intents, user identifiers, user sentiments, etc.). For example, messages received at an interactive necklace can include user information such as user intents, user identifiers, user sentiments (e.g., emoticons, response or reaction indicators, etc.), and the like. Action profile(s) 348 can store interactive necklace actions mapped to this user information. Example interactive necklace actions include: actuating one or more necklace components, actuating patterns of one or more necklace components, emitting light from one or more necklace components, emitting light patterns from one or more necklace components, other suitable necklace actions, or any combination thereof. Descriptions with references to FIGS. 4A, 4B, 5A, 5B, 6, and 7 further describe the functionality of action profile(s) 348.

Recipient selector 350 can select a set of recipient devices for a message originating from an interactive necklace. For example, implementations of an interactive necklace can transmit message(s) to a set of recipient devices in response to sensed user conditions. In some implementations, recipient selector 350 can select the set of recipient devices based on parameters for the users associated with the set of recipient devices relative to the user wearing the interactive necklace originating the message(s). Descriptions with references to FIGS. 5A, 5B, and 6 further describe the functionality of recipient selector 350.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof. Additional details on XR systems with which the disclosed technology can be used are provided in U.S. patent application Ser. No. 17/170,839, titled "INTEGRATING ARTIFICIAL REALITY AND OTHER COMPUTING DEVICES," filed Feb. 8, 2021, which is herein incorporated by reference.

Figure 4A:
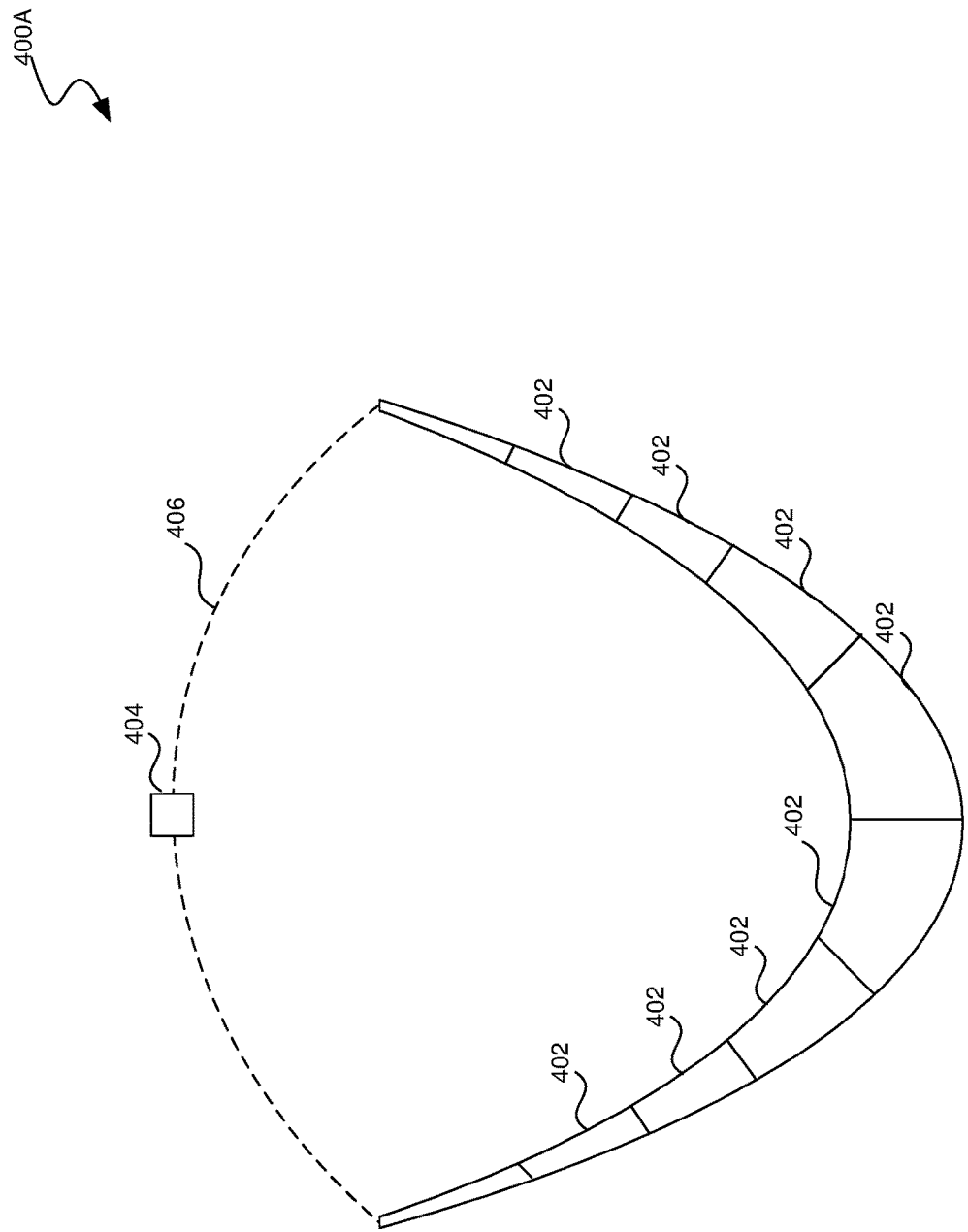
FIG. 4A is conceptual diagram of an interactive necklace.

FIG. 4A is conceptual diagram of an interactive necklace. Interactive necklace 400A includes necklace components 402, joint component 404, and chain 406. In some embodiments, necklace components 402 can be any suitable structural components that, in combination, create a band. Necklace components 402 can be any suitable shape, such as a sphere, ellipsoid, cube, rectangle, any two-dimensional or three-dimensional free form shape, etc. In the illustrated embodiment, necklace components 402 in combination comprise a front-facing portion of interactive necklace 400A, and chain 406 and joint component 404 comprise a back-facing portion of interactive necklace 400A. For example, when interactive necklace 400A is worn, necklace components 402 may rest on a user's chest and shoulders (e.g., beside the user's neck) while chain 406 and joint component 404 rest on the back of the user's neck. In some implementations, interactive necklace 400A can be worn by joining two ends of chain 406 using joint component 404. Interactive necklace 400A can be worn using any other suitable technique.

In some implementations, interactive necklace 400A comprises sensor(s), such as one or more of an accelerometer, gyroscope, thermometer, pressure sensor, vibration sensor, microphone, camera, any other suitable sensor, or any combination thereof. For example, one or more of necklace components 402 and/or joint component 404 can include sensor(s) that sense user conditions while interactive necklace 400A is worn by a user. Sensed user conditions can comprise one or more of user temperature (e.g., skin temperature), velocity/acceleration, pressure applied by the user on the interactive necklace 400A, vibration movements of the user, any other suitable user conditions, or any combination thereof.

In some implementations, interactive necklace 400A comprises one or more power components, such as a battery (e.g., rechargeable battery, lithium-ion battery, etc.), and one or more communication components. Example communication component(s) include any suitable wireless communication element and/or radio element, such as a Bluetooth radio or communication element, a Near Field Communication (NFC) radio or communication element, WiFi radio or communication element, or any other suitable wireless communication element. In some implementations, interactive necklace 400A can include action component(s), such as a light emitting element (e.g., light emitting diode (LED), etc.), audio generating element (e.g., speaker), actuation element (e.g., vibration element, such as an actuator), and the like.

In some implementations, interactive necklace 400A comprises one or more processing components, such as controller(s), memory, microprocessor(s), and the like.

Controller(s) can be any suitable microcontrollers, printed circuit boards (PCB), analog-to-digital microcontrollers, signal processing circuits, and/or any other suitable controller. In some implementations, one or more of necklace components 402 and/or joint component 404 can include the power component(s), wireless communication component(s), action component(s), and/or processing component(s) of interactive necklace 400A. A necklace controller (e.g., software executing at interactive necklace 400A) executing at the processing component(s) can process information to perform functionality, receive information from components of the necklace (sensor(s), wireless communication component(s), action component(s), and other suitable components of interactive necklace 400A), and transmit information/instructions to components of the necklace to perform the functionality of implementations.

Interactive necklace 400A depicts a single tier. FIG. 4B is conceptual diagram of a multi-tier interactive necklace. Interactive necklace 400B includes necklace tiers 410, 412, and 414. Tiers 410, 412, and 414 can each be similar to the single tier of interactive necklace 400A. In the illustrated example, interactive necklace 400B depicts a front-facing portion. A back-facing portion can be similar to the back-facing portion of interactive necklace 400A.

In some implementations, sensor(s), power component(s), communication component(s), and/or action component(s) can be located at any suitable necklace component of any of tiers 410, 412, and 414. For example, sensors can be located at different locations of interactive necklace 400B such that the user conditions sensed by these sensors can be combined. For example, changes to a wearer's head position may cause motion at the neck/shoulders, and thus one or more sensor(s) (e.g., accelerometer, gyroscope, pressure sensor, camera, etc.) can be located on the shoulder(s) directly next to the wearer's neck (e.g., trapezius muscle), proximate to the wearer's neck, on the back of the wearer's neck (e.g., at a necklace joint component or any other suitable component), and the like. When a pressure sensor is located at or proximate to the wearer's neck, a contortion of the neck can be sensed as a change in pressure. In some implementations, interactive necklace 400B includes multiple pressure sensors, and their combined signals can indicate wearer head and/or neck positioning.

In some implementations, a first sensor can be located at a first portion of interactive necklace 400B (e.g., tier 414, on the back of the neck when worn, etc.) and a second sensor can be located at a second portion of interactive necklace 400B (e.g., tier 410, on the chest when worn, etc.), and a combination of the signals for the first and second sensors can indicate a specific motion of a wearer. For example, when the first and second sensors comprise accelerometers and/or gyroscopes (e.g., an inertial measurement unit), subtraction of the sensed conditions from the first and second sensors can isolate certain types of wearer movement (e.g., head or neck movement, etc.) and/or indicate certain wearer body positioning (e.g., head position).

In some implementations, vibration sensors and/or pressure sensors located at a wearer's chest can sense signals indicative of one or more user conditions, such as changes in breathing, laughing, and other suitable user conditions. In some implementations, an interactive necklace can be configured to be worn on the neck, such as a choker style necklace, and one or more sensor(s) can be located at different portions of the wearer's neck.

In some implementations, actuation components can be located at different ones of tiers 410, 412, and 414 such that the control of these actuation components can generate an actuation pattern (e.g., vibration pattern) across a portion of the wearers body. Example actuation patterns include a time sequenced horizontal pattern (e.g., left to right, right to left, etc.), time sequenced vertical pattern (e.g., top to bottom, bottom to top), a side pattern (e.g., two, three, or more actuators on a single side, such as the left side or the right side), time sequenced side pattern (e.g., left side to right side, right side to left side), tier pattern or time sequenced tier pattern (e.g., two, three, or more or more actuators on a single tier, or a pattern that moves from tier to tier), and other suitable patterns.

Interactive necklaces 400A and 400B are examples of interactive necklaces, and any other suitable structural elements or designs can be implemented. For example, an interactive necklace can comprise a 360-degree band of beads, multiple tiers of bead bands, one or more uniform tiers (e.g., tiers not segmented into necklace components), necklace styles worn at different portions of the body (e.g., choker style around the neck, necklace worn down the back, etc.), any other suitable necklace style, or any combination thereof.

Figure 5A:
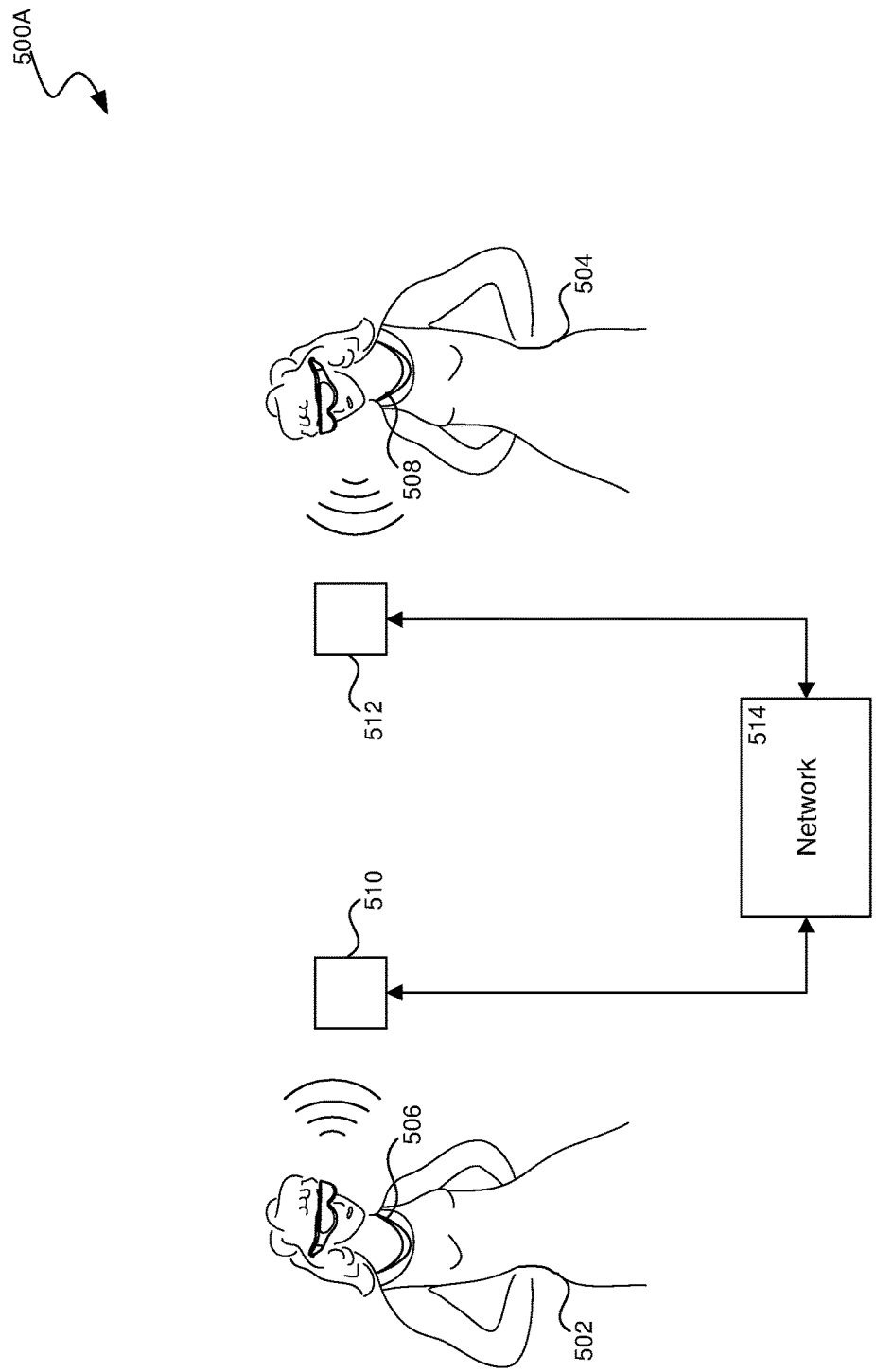
FIG. 5A is a diagram illustrating components of a system for communication between multiple interactive necklaces.

Implementations of an interactive necklace can, in response to sensing user conditions, transmit message(s) to other computing devices, such as other interactive necklace(s), smartphone(s), smart home computing device(s), laptop(s), tablet(s), server(s), edge device(s), cloud device(s), and any other suitable computing devices. FIG. 5A is a diagram illustrating components of a system for communication between multiple interactive necklaces. System 500A includes users 502 and 504, interactive necklaces 506 and 508, access points 510 and 512, and network 514.

In some implementations, user 502 can wear interactive necklace 506 and user 504 can wear interactive necklace 508. Users 502 and 504 can be in different locations (e.g., remote from one another) and interactive necklaces 506 and 508 can communicate over network 514. For example, interactive necklace 506 can access network 514 via access point 510. In some implementations, network 514 can be a wireless network, wired network, or any combination thereof. Network 514 can also be a packet switched network, wireless communication protocol network (e.g., long term evolution (LTE), 3G, 4G, 5G, evolved packet core (EPC), wireless local area network, etc.), network that implements any other suitable communication protocol, or any combination thereof.

Access point 510 can be the point where interactive necklace 506 accesses network 514. In some implementations, access point 510 can be a wireless network access point, such as a WiFi access point (e.g., router), cellular access point (e.g., access node), any other suitable wireless network access point, or any combination thereof. In this example, interactive necklace 506 can transmit wireless transmissions to access point 510 and receive wireless transmissions from access point 510. In some implementations, access point 510 can be a computing device that accesses network 514 such as a smartphone, smart home device, laptop, tablet, IoT device, or any other suitable computing device. For example, the computing device can comprise a connection with network 514 and relay communication to/from interactive necklace 506 to network 514. In some implementations, interactive necklace 508 can be similarly connected to network 514 via access point 512.

In some implementations, interactive necklace 506 can transmit messages to interactive necklace 508 (e.g., via access point 510, network 514, and access point 512). For example, the user conditions sensed at interactive necklace 506 can be matched to one or more user condition templates and, in response to the matching, one or more messages can be transmitted. User condition templates can comprise definitions, such as value ranges, thresholds, user state(s) (e.g., head position, change in head position), etc., for one or more sensed user conditions. In some implementations, user condition templates can be mapped to user intents, for example via one or more predefined mappings. User intents can represent user sentiments, emotions, reactions, language (e.g., words), or any other suitable user intention.

In some implementations, user intents can include nuanced sentiments within a category, such as: A) Happy: laughing, smiling, smirking, entertained, etc.; B) Sad: upset, insecure, emotional, crying, etc.; C) Angry: irked, irritated, irate, yelling, etc.; D) or any combination thereof. In some implementations, user intents can be response user intents, such as user intents that represent the user's response to a stimulus, action, or event, such as a video, audio, meeting (e.g., virtual meeting, video meeting, holographic meeting, etc.), telephone call, announcement, document, sporting event, text or message thread, etc. Example response user intents can be laughing, smiling, in agreement, irked, irritated, disagreement, upset, angry, irate, etc. In some implementations, user intents can represent emoticons, such as a smiling facing, laughing face, embarrassed face, frowning face, etc. In some implementations, user intents can be mapped to language, such as individual words or phrases of a language (e.g., English, Spanish, French, Hindi, etc.). For example, user intents can comprise a list of words or phrases (e.g., predetermined list) that are mapped to user condition templates.

In some implementations, mappings between user condition templates and user intents can be predefined. An example user condition template can be: chest vibration (e.g., up and down movement) sensed by a threshold number of sensors across the user's chest. Sensed user conditions by interactive necklace 506 can match this user condition template when a threshold number of sensors across user 502's chest sense vibration (e.g., up and down movement) from the user. This example user condition template can be mapped to a laughing (or laughing response) user intent.

In another example, the user condition template can have multiple parameters that can distinguish one template for another. A first user condition template can be: chest vibration sensed by a threshold number of sensors across the user's chest AND head position upright, tilted to the side, front, or back. A second user condition template can be: chest vibration sensed by a threshold number of sensors across the user's chest AND head position tilted down or head in hands. In this example, the first user condition template can be mapped to laughing or a laughing response user intent while the second user condition template can be mapped to crying or a crying response user intent.

In the above example, the first and second user condition templates and mapped user intents correspond to conventional user behavior representative of user intent, such as sensing the chest movements and head position that a user exhibits when laughing or crying. Other example user condition templates and mapped user intents can correspond to learned user behavior (e.g., user behavior not conventionally representative of user intent). The following example mappings between user condition templates and user intents can be predefined: head tilt left to an agreement response, head tilt right to a disagreement response, repeated head movement up and down to an enthusiastic agreement response, and repeated head movement side to side to an enthusiastic disagreement response. In another example, user condition templates and mapped user intents can associate user actions/behavior to individual words or phrases of a language. The following example mappings between user condition templates and user intents can be predefined: head tilt left to the word 'maybe', head tilt right to the phrase 'I don't know', head movement up and down to the word 'yes', and repeated head movement side to side to the word 'no'.

In this example, while users 502 and 504 remotely experience a simultaneous audio, video, and/or XR session, such as a political speech, company meeting, sporting event, etc., interactive necklace 506 can sense the head position of user 502 and transmit messages to interactive necklace 508 in response to user 502's head positioning. In some implementations, when the user conditions sensed by interactive necklace 506 match one of the above user condition templates (e.g., head tilt left, head tilt right, repeated head movement up and down, repeated head movement side to side), interactive necklace 506 can transmit a message that includes an identifier for user 502 (e.g., user identity) and the user intent mapped to the sensed user conditions/matched user condition template.

In some implementations, user condition templates and/or mapped user intents can be defined by a user, predefined for one or more applications, defined by one or more machine learning models, or any combination thereof. For example, user 502 can explicitly define user condition templates, such as head position/movement, chest movement, shoulder movement, sequence of head positions/movements, or any combination thereof. In this example, a user can also explicitly map the defined user condition templates to one or more user intents.

In some implementations, user condition templates and/or mapped user intents can be predefined for one or more applications. For example, a holographic calling application, virtual meeting application, video or audio conference application, simultaneous broadcast viewing application, etc. can include one or more predefined user condition templates and/or mapped user intents for interactive necklace 506. The predefined user condition templates and mapped user intents can be learned by user 502 such that the user can express intents via messages to interactive necklace 508/user 504.

In some implementations, one or more machine learning models can define the user condition templates and/or mapped user intents. For example, machine learning model(s) can define user condition templates using historical sensor data from interactive necklace(s), historical user movements determined by computer vision model(s), or any other suitable historical data. In some implementations, video of users experiencing events, meetings, XR sessions, or any other suitable stimuli can be input into computer vision models configured/trained to identify distinct user movements. Example distinct user movements can include head movements, neck movements, shoulder movements, chest movements, upper-body movements, or any other suitable movements. In some implementations, sensor data that would be sensed by a worn interactive necklace while a user performs these distinct movements can be estimated, and the estimates can define user condition templates. In another example, user(s) can wear interactive necklace(s) while experiencing events, meetings, XR sessions, or any other suitable stimuli, and the recorded sensor data can be processed by one or more machine learning models to identify distinct user movements. The sensor data during these distinct user movements can define user condition templates.

In some implementations, one or more machine learning models can define mappings between the defined user condition templates and user intents. For example, user behavior can be recorded during events, meetings, XR sessions, or any other suitable stimuli, such as user video, sensor data from a worn interactive necklace, language/utterances by the user, and/or text provided by the user. In some implementations, user condition templates can be defined based on the user recordings, for instance using computer vision models and/or other machine learning model(s). The recorded user video, user language/utterances, and/or text provided by the user during the user movements/behavior that define a user condition template can indicate a user intent that corresponds to the user condition template. For example, one or more computer vision models can determine the user's facial expressions during the user movements/behavior that define a user condition template, and the determined facial expressions can indicate a user intent (e.g., agree, disagree, smiling, frowning, confused, laughing, angry, sad, dissatisfied, etc.).

In another example, one or more natural language processing models (e.g., sentiment prediction model(s)) can analyze the user's utterances (e.g., transcript) or text provided by the user (e.g., in a chat, text message, etc.) during the user movements/behavior that define a user condition template, and the output from the natural language processing model(s) can be indicative of a user intent (e.g., in agreement, disagreement, satisfied, dissatisfied, upset, angry, happy, irked, word 'yes', word 'no', phrase 'I don't know', or any other suitable emotion, sentiment, response, word, phrase, etc.). These determined user intents are mapped to their corresponding user condition templates. In some implementations, recorded user behavior (e.g., user video, user language/utterances, and/or text provided by the user) can be analyzed by machine learning model(s) to identify moments that correspond to an expressed user intent, and the user's movements/behavior during these expressed user intents can be identified/defined as a user condition template.

In some implementations, the recorded user behavior used to define user condition templates and/or user intents can be personalized to an individual user. For example, machine learning model(s) can analyze recorded user behavior (e.g., user video, signals from a worn interactive necklace, language/utterances by the user, and/or text provided by the user) for user 502 to generate individualized user condition templates and/or individualized mappings between user condition templates and user intents. In this example, interactive necklace 506 can transmit a message comprising a user intent for user 502 that is triggered by matching an individualized user condition template that maps to an individualized user intent.

In some implementations, interactive necklace 506 can compare the sensor data values sensed from user 502 with the predefined user condition templates. When the sensor data values match a predefined user condition template, interactive necklace 506 can transmit a message to interactive necklace 508 that comprises the user intent mapped to the matched user condition template and an identifier for user 502. In some implementations, interactive necklace 506 can communicate with access point 510, and, based on the communication, access point 510 can transmit message(s) to interactive necklace 508. For example, access point 510 can be a smartphone, smart home device, laptop, tablet, IoT device, or any other suitable companion computing device for interactive necklace 506. In some implementations, interactive necklace 506 can transmit the sensor data values to access point 510, and access point 510 can match the sensor data values to a predefined user condition template.

In this example, access point 510 can transmit the message(s) to interactive necklace 508 comprising the identifier for user 502 and the user intent mapped to the matched user condition template.

In some implementations, interactive necklace 508 can receive message(s) from interactive necklace 506/access point 510 and perform an action that corresponds to the message. For example, interactive necklace 508 can store predefined mappings between necklace actions and user intents. Example necklace actions include: actuating one or more necklace components, actuating patterns of one or more necklace components, emitting light from one or more necklace components, emitting light patterns from one or more necklace components, other suitable necklace actions, or any combination thereof. User 504 may understand (or learn to understand) the user intent from the received message (e.g., communicated by user 502 via interactive necklace 506) by perceiving the action performed by interactive necklace 508.

For example, user 504 may feel portions of interactive necklace 508 vibrate (e.g., via actuation of specific necklace components, an actuation pattern, etc.) according to the necklace action mapped to the user intent from the received message, and in turn user 504 may understand the user intent (e.g., reaction, emotional state, sentiment, words, phrases, etc.) communicated by user 502/interactive necklace 506. In another example, user 504 may perceive light emitting from interactive necklace 508 according to the necklace action mapped to the user intent from the received message, and in turn user 504 may understand the user intent communicated by user 502/interactive necklace 506. In these implementations, the sentiments, reactions, words, phrases, and/or emotions of user 502 can be sensed by interactive necklace 506 (e.g., via sensed user conditions that map to a user condition template/mapped user intent), relayed to interactive necklace 508 (e.g., as a message comprising the user intent), and perceived by user 504 (e.g., via a mapped necklace action).

In some implementations, interactive necklace 508 can similarly sense user conditions from user 504 and transmit message(s) to interactive necklace 506. In response, interactive necklace 506 can perform a mapped necklace action that is perceived by user 502. In these implementations, the sentiments, reactions, words, phrases, and/or emotions of user 502 can be perceived by user 504 via sensing by interactive necklace 506 and action by interactive necklace 508, and the sentiments, reactions, words, phrases, and/or emotions of user 504 can be perceived by user 502 via sensing by interactive necklace 508 and action by interactive necklace 506. In some implementations, the messages between interactive necklace 506 and interactive necklace 508 can represent a dialogue between user 502 and user 504.

In some implementations, an interactive necklace can transmit messages comprising a user intent to computing devices other than an interactive necklace. FIG. 5B is a diagram illustrating components of a system for communication between an interactive necklace and an other computing device. System 500B includes user 502, interactive necklace 506, access point 510, network 514, mobile device 520, computing device 522, and server 524. User 502, interactive necklace 506, access point 510, and network 514 illustrated in FIG. 5B can be similar to user 502, interactive necklace 506, access point 510, and network 514 illustrated in FIG. 5A. Mobile device 520 can be a smartphone, a tablet, a smartwatch, an IoT device, or any other suitable mobile device. Computing device 522 can be a XR device, an IoT device, a smart home device, an edge device, or any other suitable computing device. Server 524 can be a cloud server, an edge server, a data center server, or any other suitable server.

In some implementations, interactive necklace 506 can transmit messages (e.g., via access point 510 and network 514) to one or more of mobile device 520, computing device 522, and server 524. For example, in response to sensing user conditions that match a predefined user condition template and mapped user intent, interactive necklace 506 (and access point 510) can transmit a message comprising the mapped user intent and an identifier for user 502 to one or more of mobile device 520, computing device 522, and server 524. Mobile device 520, computing device 522, and/or server 524 can perform action(s) in response to receiving the message.

In some implementations, mobile device 520 can store predefined mappings between user intents (e.g., received in a message from an interactive necklace) and mobile device actions. For example, mobile device actions can target user 502 based on the user identifier received in the message. Example mobile device actions include inserting a sentiment indicator (e.g., emoticon, reaction indicator, etc.) in a text dialogue (e.g., text message, chat application, social media application, etc.) for user 502, changing an expression on an avatar for/representation of user 502, adding an expression indicator (e.g., emoticon) to an avatar for/representation of user 502, and other suitable mobile device actions.

In some implementations, computing device 522 can store predefined mappings between user intents and computing device actions. For example, computing device actions can target user 502 based on the user identifier received in the message. Example computing device actions include generating audio representative of the user intent communicated by user 502 (e.g., predefined sound, predefined voice reciting predefined words, etc.), changing an expression on an avatar for/representation of user 502, adding an expression indicator to an avatar for/representation of user 502, adjusting environment parameters for user 502 (e.g., a room temperature, lighting, sound level, etc.), and other suitable computing device actions.

In some implementations, server 524 can store predefined mappings between user intents and server actions. For example, server actions can target user 502 based on the user identifier received in the message. Example server actions include changing an expression on an avatar for/representation of user 502, adding an expression indicator to an avatar for/representation of user 502, adjusting XR environment parameters displayed to user 502 (e.g., reducing display clutter, moving user 502 into a different location in an XR environment, removing user 502 from the XR environment, etc.), and other suitable server actions.

In some implementations, interactive necklace 506/access point 510 can select a set of recipient computing devices for a message comprising user 502's user intent, such as interactive necklace(s), mobile device(s), server(s), any other suitable computing device, or any combination thereof. For example, a set of permitted users/computing devices can be explicitly defined by user 502. In another example, a representation of user 502 can be present in an XR environment, and users (and their devices) within a threshold proximity distance from the representation of user 502 in the XR environment can be selected for messaging. In another example, users (and their devices) present in an application or shared session with user 502 (e.g., VR meeting, video meeting, holographic meeting, audio, video, or holographic call, etc.) can be selected for messaging.

In some implementations, messaging can be triggered between interactive necklace 506 and one or more other computing devices. For example, in response to user 502 joining/initiating a shared application session with other users, messaging can be triggered between interactive necklace 506 and the computing devices for the other users. In another example, user 502 may permit 'always on' messaging between interactive necklace 506 and a subset of other computing devices. For example, returning to FIG. 5A, interactive necklace 506 and interactive necklace 508 can comprise a persistent connection. The persistent connection can be configured by users 502 and/or 504 (e.g., via an application for the interactive necklaces), established based on a social network relationships between users 502 and 504 (e.g., friend link), established between interactive necklace 506 and interactive necklace 508 (e.g., prior to any user association, such as a hardware or firmware connection), and the like.

In some implementations,

A "machine learning model," as used herein, refers to a construct that is trained or configured using a data set (e.g., training data) to generate predictions, provide probabilities, estimate values, and the like, in response to input data. For example, training data for supervised learning can include items with various parameters/features and an assigned classification or any other suitable data label. A new data item can have parameters/features that a model can use to predict a classification to the new data item (e.g., predict a label for the new data item). As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

Implementations perform computer vision workloads using one or more computer vision machine learning models. For example, computer vision machine learning models can include convolutional neural networks, encoder/decoder models, transformer models, or any other suitable machine learning model. In some implementations, computer vision models can be trained to identify and/or track user movements, such as head movements, neck movements, arm movements, shoulder movements, chest movements, user gaze, etc.

Implementations perform natural language processing workloads using one or more natural language processing models. For example, natural language processing models can include recurrent neural networks, encoder/decoder models, transformer models, attention and multi-head attention models, long short-term memory models, or any other suitable machine learning model. In some implementations, natural language processing models can be trained to predict user sentiment, emotion, or reactions for natural language text and/or voice transcriptions.

In some implementations, sensed user conditions from an interactive necklace can be used to estimate user head positioning or gaze direction. For example, the interactive necklace can include one or more accelerometers and/or gyroscopes (e.g., IMUs), cameras, pressure sensors, and other suitable sensors that can detect head/neck movement. In some implementations, one or more machine learning models can be trained to estimate a user head position based on sensor data from the interactive necklace. The sensed user head position can match one or more user condition templates and mapped user intent, and message(s) can be transmitted to recipient devices based on the match.

In some implementations, an interactive necklace can include electromagnetic transmitters and receivers (e.g., electromyography sensors) that sense a state of muscles in the user's neck and/or shoulders. For example, the electromagnetic transmitters/receivers can sense electrical signals at the user's neck and/or shoulders that indicate the state of the user's muscles. These electrical signals can comprise a portion of the user conditions sensed by the interactive necklace. For example, the sensed electrical signals can be used to determine the user's head position, changes to the user's head position, user's shoulder positions, changes to the user's shoulder positions, any other user body movements, or any other suitable user condition. Implementations can determine a match between the sensed user conditions and one or more user condition templates with a mapped user intent, and transmit, to one or more other computing devices, message(s) in response to the match.

Those skilled in the art will appreciate that the components illustrated in FIGS. 1-3, 4A, 4B, 5A, and 5B described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 6:
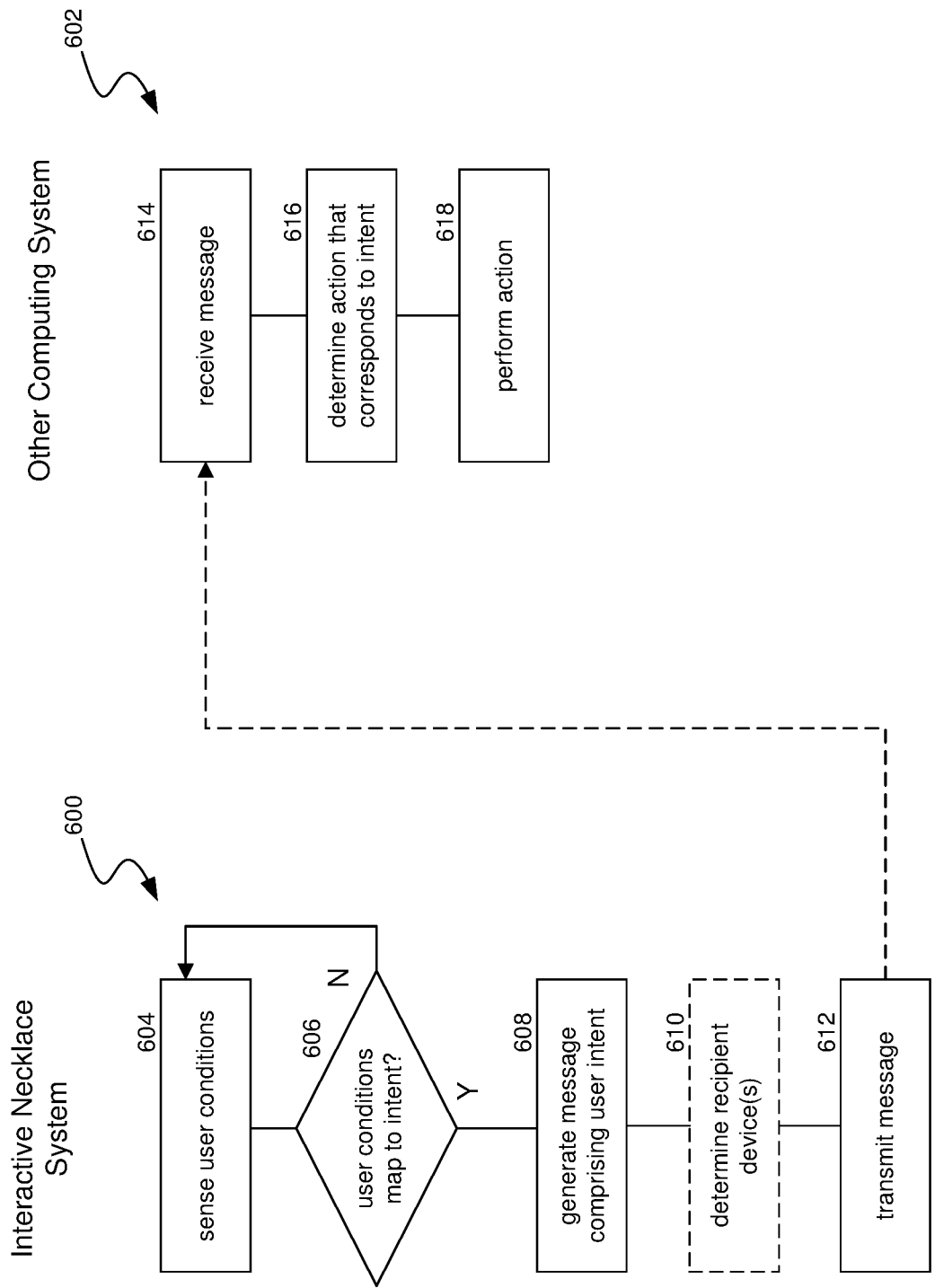
FIG. 6 is a flow diagram illustrating a process used in some implementations for sensing user conditions via an interactive necklace and transmitting one or more messages that support user interactivity.

FIG. 6 is a flow diagram illustrating a process used in some implementations for sensing user conditions via an interactive necklace and transmitting one or more messages that support user interactivity. In some implementations, processes 600 and 602 can be performed while a user wears an interactive necklace. In some implementations, process 600 can be performed by an interactive necklace system (e.g., interactive necklace, interactive necklace and another device, such as a smartphone, etc.) and process 602 can be performed by an other computing system. Example other computing systems include an other interactive necklace system, a smartphone, a tablet, a laptop, a XR device, an IoT device, a server, a smart home computing device (e.g., smart speaker with or without display, smart hub, smart appliance, etc.), a cloud computing device, an edge computing device, a mobile computing device, or any other suitable computing system.

At block 602, process 600 can sense user conditions using one or more sensors of the interactive necklace. For example, when the interactive necklace is worn by a user, one or more sensors can sense user conditions. Example sensors include an accelerometer, gyroscope, thermometer, pressure sensor, vibration sensor, microphone, camera, any other suitable sensor, or any combination thereof. In some implementations, at least one sensed user condition comprises user motion sensed by one or more of a pressure sensor, an accelerometer, a gyroscope, or any combination thereof. Example user motion includes head motion, neck motion, shoulder motion, chest motion, or any other suitable user motion.

At block 604, process 600 can determine whether the sensed user conditions map to a defined user intent. For example, mappings between user condition templates and user intents can be predefined. User condition templates can define sensor data value ranges, thresholds, user states (e.g., head positioning), or any other suitable user condition definition. Implementations can compare sensed user conditions (e.g., sensor signals from the interactive necklace sensors) to the predefined user condition templates to determine a matching user condition template. When a matching user condition template is determined, the user intent mapped to the matching user condition template can be mapped to the sensed user conditions.

When the sensed user conditions map to a user intent, process 600 can progress to block 608. When the sensed user conditions do not map to a user intent, process 600 can loop back to block 604, where user conditions can continue to be sensed until the sensed user conditions map to a user intent. At block 608, process 600 can generate a message for transmission according to the mapped user intent. For example, the generated message can comprise one or more indicators of the mapped user intent, a user identifier, or any combination thereof.

At block 610, process 600 can determine recipient devices for the generated message. For example, determined recipient devices can include an interactive necklace system, mobile device, laptop, IoT device, XR system, server, smartphone, smart home device, any other suitable computing device, or any combination thereof. In some implementations, a set of permitted users/computing devices can be explicitly defined by a user (e.g., the user wearing the interactive necklace).

In another example, a representation of the user can be present in an XR environment, and user(s) within a proximity distance (e.g., distance threshold) from the representation of the user in the XR environment can be selected for messaging. In this example, the user may interact with a XR system that displays the XR environment to the user. In addition, other user(s) proximate to the user in the XR environment may each interact with a XR system. The XR system(s) associated with other user(s) proximate to the user in the XR environment can be selected as recipient device(s) for the generated message. In another example, interactive necklace(s) worn by user(s) proximate to the user in the XR environment can be selected as recipient device(s) for the generated message.

In another example, user(s) that participate in an application or shared session with the user (e.g., VR meeting, video meeting, holographic meeting, audio, video, or holographic call, etc.) can be selected for messaging. In this example, each participating user can be associated with a computing device (e.g., computer, laptop, tablet, smartphone, etc.), and these computing device(s) can be selected as recipient device(s). In another example, interactive necklace(s) worn by the participating user(s) can be selected as recipient device(s) for the generated message.

At block 612, process 600 can transmit the message to the recipient device(s). For example, the interactive necklace system can transmit one or more messages comprising the mapped user intent and the user identifier to one or more recipient devices.

At block 614, process 602 can receive the message transmitted from the interactive necklace system. For example, recipient devices can receive the message transmitted by the interactive necklace system. Example recipient devices include an interactive necklace system, mobile device, laptop, IoT device, XR system, server, smartphone, smart home device, any other suitable computing device, or any combination thereof.

At block 616, process 602 can determine an action that corresponds to the user intent and/or user identifier comprised in the received message. For example, recipient devices can store predefined mappings between device actions and user intents, device actions and user identifiers, or any combination thereof. Example interactive necklace actions include: actuating one or more necklace components, actuating patterns of one or more necklace components, emitting light from one or more necklace components, emitting light patterns from one or more necklace components, other suitable necklace actions, or any combination thereof. Example mobile device (e.g., smartphone, smartwatch, etc.) actions include inserting a sentiment indicator (e.g., emoticon, reaction indicator, etc.) in a text dialogue (e.g., text message, chat application, social media application, etc.) for the user identified in the received message, changing an expression on an avatar for/representation of the user identified in the received message, adding an expression indicator (e.g., emoticon) to an avatar for/representation of the user identified in the received message, and other suitable mobile device actions.

Example server actions (e.g., cloud server, data center server, etc.) include changing an expression on an avatar for/representation of the user identified in the received message, adding an expression indicator to an avatar for/representation of the user identified in the received message, adjusting XR environment parameters displayed to the user identified in the received message (e.g., reducing display clutter, moving the user into a different location in an XR environment, removing the user from the XR environment, etc.), and other suitable server actions. Example other computing device actions (e.g., XR system, IoT device, smart home device, edge device, etc.) include generating audio representative of the user intent communicated by the user identified in the received message (e.g., predefined sound, predefined voice reciting predefined words, etc.), changing an expression on an avatar for/representation of the user identified in the received message, adding an expression indicator to an avatar for/representation of the user identified in the received message, adjusting environment parameters for the user identified in the received message, (e.g., a room temperature, lighting, sound level, etc.), and other suitable computing device actions.

At block 618, process 602 can perform the determined action. For example, a recipient interactive necklace can perform an actuation, an actuation pattern, a light emission, and/or a light emission pattern that corresponds to the user intent and/or the user identifier from the received message. In other examples, mobile device(s), server(s), and/or other computing device(s) can perform determined actions that correspond to the user intent and/or the user identifier from the received message.

Figure 7:
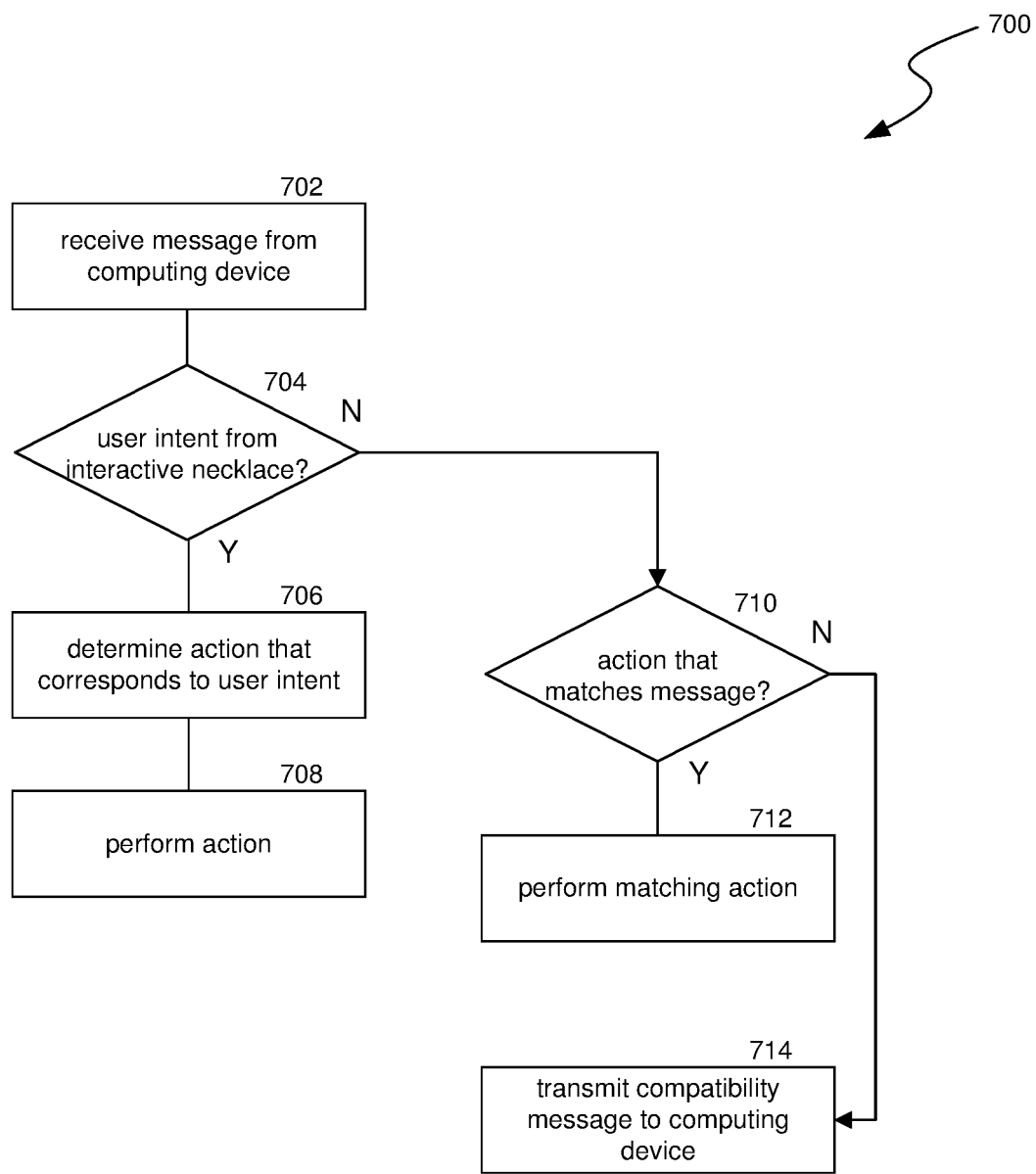
FIG. 7 is a flow diagram illustrating a process used in some implementations for receiving communication at an interactive necklace and executing a corresponding action.

FIG. 7 is a flow diagram illustrating a process used in some implementations for receiving communication at an interactive necklace and executing a corresponding action. In some implementations, process 700 can be performed in response to an interactive necklace system (e.g., interactive necklace, interactive necklace and another device, such as a smartphone, etc.) receiving a message. In some implementations, the received message can originate at an other computing system. Example other computing systems include an other interactive necklace system, a smartphone, a tablet, a laptop, a XR device, an IoT device, a server, a smart home computing device (e.g., smart speaker with or without display, smart hub, smart appliance, etc.), a cloud computing device, an edge computing device, a mobile computing device, or any other suitable computing system.

At block 702, process 700 can receive one or more messages from an originating computing device. For example, originating computing devices can include an interactive necklace system, mobile device, laptop, IoT device, XR system, server, smartphone, smart home device, any other suitable computing device. In some implementations, a message from an interactive necklace system can comprise a user identifier and a user intent. Messages from other computing devices can comprise a user identifier, user information (e.g., an emoticon, a reaction indicator, a user sentiment, user intent, etc.), and/or any other suitable message content.

At block 704, process 700 can determine whether the message comprises a user intent from an other interactive necklace. For example, messages from interactive necklace systems can comprise a predefined user intent from a user identifier associated with an interactive necklace system. Messages from other computing devices may comprise user information other than a user intent. When the message comprises a user intent from an other interactive necklace, process 700 can progress to block 706. When the message does not comprise a user intent from an other interactive necklace, process 700 can progress to block 710.

At block 706, process 700 can determine an action that corresponds to the user intent and/or the user identifier from the message. For example, the interactive necklace system can store predefined mappings between interactive necklace actions and user intents, interactive necklace actions and user identifiers, or any combination thereof. Example interactive necklace actions include: actuating one or more necklace components, actuating patterns of one or more necklace components, emitting light from one or more necklace components, emitting light patterns from one or more necklace components, other suitable necklace actions, or any combination thereof.

At block 708, process 700 can perform the determined action. For example, the interactive necklace can perform an actuation, an actuation pattern, a light emission, and/or a light emission pattern that corresponds to the user intent and/or the user identifier from the received message.

At block 710, process 700 can determine whether an action matches the received message. For example, the message may be from a computing device other than an interactive necklace system, and thus a user intent may not be included in the message. The interactive necklace may store predefined mappings between interactive necklace actions and other user information (e.g., emoticons, reaction indicators, a user sentiment), interactive necklace actions and user identifiers, or any combination thereof. Messages that comprise user information that matches at least one of the predefined mappings can comprise a matching action.

When an action matches the received message, process 700 can progress to block 712. When an action does not match the received message, process 700 can progress to block 716. At block 712, process 700 can perform the matching action. For example, the interactive necklace can perform an actuation, an actuation pattern, a light emission, and/or a light emission pattern that corresponds to the user information and/or the user identifier from the received message.

At block 714, process 700 can transmit a compatibility message to the originating computing device. For example, when a matching interactive necklace action is not determined, a compatibility issue may cause a communication error between the originating computing device and the interactive necklace system. Accordingly, the interactive necklace system can transmit a compatibility error message to the originating computing device.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A computing system for sensing user conditions via an interactive necklace that supports user interactivity, the computing system comprising:
   the interactive necklace comprising one or more processing components and one or more sensors including at least one body position sensor; and
   one or more memories storing instructions that, when executed by the one or more processing components, cause the computing system to perform a process comprising:
      sensing, by the one or more sensors when the interactive necklace is worn by a user, user conditions, wherein at least one user condition comprises user motion and/or position sensed by the body position sensor;
      determining that the sensed user conditions of the motion and/or position map to a user intent; and
      transmitting, to an other computing device, a message based on the mapped user intent from the motion and/or position wherein, in response to receiving the message, the other computing device performs an action comprising one or more of: A) altering the display of an avatar for the user according to the mapped user intent from the motion and/or position; B) indicating the mapped user intent from the motion and/or position by actuating one or more illumination and/or haptic elements of the other computing device; C) generating a reaction indicator, indicating the mapped user intent from the motion and/or position, within a text conversation, audio call, video call, or holographic call; or D) any combination thereof.

2. The computing system of claim 1, wherein:
   the other computing device comprises an other interactive necklace,
   the one or more elements of the other computing device comprise a predefined portion of the interactive necklace,
   the action performed by the other interactive necklace in response to receiving the message comprises the indicating the mapped user intent from the motion and/or position by actuating one or more illumination and/or haptic elements of the other interactive necklace by actuating the predefined portion of the other interactive necklace, and
   the predefined portion of the other interactive necklace corresponds to the mapped user intent from the motion and/or position.

3. The computing system of claim 2,
   wherein the actuating of the predefined portion of the other interactive necklace comprises actuating the predefined portion of the interactive necklace according to a predefined actuation pattern, and wherein the predefined actuation pattern, for which the predefined portion of the interactive necklace, corresponds to the mapped user intent from the motion and/or position.

4. The computing system of claim 1, wherein the body position sensor comprises a pressure sensor or accelerometer, and the sensed user motion and/or position comprises a head motion, a neck contortion, or any combination thereof.

5. The computing system of claim 1, wherein the determining that the sensed user conditions map to a user intent comprises:
   determining a user head position according to the sensed user conditions; and
   matching the determined head position to the user intent via a pre-defined mapping of head positions to user intents.

6. The computing system of claim 1, wherein the determining that the sensed user conditions map to a user intent comprises:
   comparing the sensed user conditions to one or more predefined user condition templates; and
   mapping, when the sensed user conditions match at least one user condition template, the at least one matched user condition template to the user intent.

7. The computing system of claim 6, wherein the at least one matched user condition template is mapped to the user intent using predefined mappings between predefined user condition templates and predefined user intents.

8. The computing system of claim 7, wherein the predefined mappings are generated by a trained machine learning model.

9. The computing system of claim 1, wherein transmitting the message, to the other computing device, further comprises:
   selecting a set of recipient computing devices for the message, wherein the other computing device is part of the selected set of recipient devices; and
   transmitting, to the set of recipient devices, the message, wherein, in response to receiving the message, the set of recipient devices each perform an action comprising one or more of: A) altering the display of an avatar for the user according to the mapped user intent; B) actuating one or more illumination and/or haptic elements of the other computing device; C) generating a reaction indicator for the user within a text conversation, audio call, video call, or holographic call; or D) any combination thereof.

10. The computing system of claim 9, wherein the selected set of recipient computing devices comprise computing devices corresponding to other users, and the set of recipient computing devices are selected based on a metric for the corresponding other users meeting a criteria associated with the mapped user intent.

11. The computing system of claim 10, wherein the metric for the computing devices corresponding to other users comprises one or more of a social media metric, a distance metric relative to a location of the user within a shared artificial reality environment, a user group membership metric, or any combination thereof.

12. A method for sensing user conditions via an interactive necklace that supports user interactivity, the method comprising:
   sensing, by one or more sensors of an interactive necklace when the interactive necklace is worn by a user, user conditions, wherein at least one user condition comprises user motion and/or position sensed by a body position sensor of the interactive necklace;
   determining that the sensed user conditions of the motion and/or position map to a user intent; and
   transmitting, to an other computing device, a message based on the mapped user intent from the motion and/or position, wherein, in response to receiving the message, the other computing device performs an action comprising one or more of: A) altering the display of an avatar for the user according to the mapped user intent from the motion and/or position; B) indicating the mapped user intent from the motion and/or position by actuating one or more illumination and/or haptic elements of the other computing device; C) generating a reaction indicator, indicating the mapped user intent from the motion and/or position, within a text conversation, audio call, video call, or holographic call; or D) any combination thereof.

13. The method of claim 12, wherein;
   the other computing device comprises an other interactive necklace,
   the one or more elements of the other computing device comprise a predefined portion of the interactive necklace,
   the action performed by the other interactive necklace in response to receiving the message comprises the indicating the mapped user intent from the portion and/or position by actuating one or more illumination and/or haptic elements of the other interactive necklace by actuating the predefined portion of the other interactive necklace, and
   the predefined portion of the other interactive necklace corresponds to the mapped user intent from the motion and/or position.

14. The method of claim 13,
   wherein the actuating of the predefined portion of the other interactive necklace comprises actuating the predefined portion of the interactive necklace according to a predefined actuation pattern, and
   wherein the predefined actuation pattern, for which the portion of the interactive necklace, corresponds to the mapped user intent from the motion and/or position.

15. The method of claim 12, wherein the body position sensor comprises a pressure sensor or accelerometer, and the sensed user motion and/or position comprises a head motion, a neck contortion, or any combination thereof.

16. The method of claim 12, wherein the determining that the sensed user conditions map to a user intent comprises:
   determining a user head position according to the sensed user conditions; and
   mapping the determined head position to the user intent.

17. The method of claim 12, wherein the determining that the sensed user conditions map to a user intent comprises:
   comparing the sensed user conditions to one or more predefined user condition templates; and
   mapping, when the sensed user conditions match at least one user condition template, the at least one matched user condition template to the user intent.

18. The method of claim 17, wherein the at least one matched user condition template is mapped to the user intent using predefined mappings between predefined user condition templates and predefined user intents.

19. The method of claim 18, wherein the predefined mappings are generated by a trained machine learning model, manual user input, or any combination thereof.

20. A non-transitory computer-readable storage medium storing instructions that, when executed by a computing system, cause the computing system to perform a process for sensing user conditions via an interactive necklace that supports user interactivity, the process comprising:

sensing, by one or more sensors of an interactive necklace when the interactive necklace is worn by a user, user conditions, wherein at least one user condition comprises user motion and/or position sensed by a body position sensor of the interactive necklace;

determining that the sensed user conditions of the motion and/or position map to a user intent; and transmitting, to an other computing device, a message based on the mapped user intent from the motion and/or position, wherein, in response to receiving the message, the other computing device performs an action comprising one or more of: A) altering the display of an avatar for the user according to the mapped user intent from the motion and/or position; B) indicating the mapped user intent from the motion and/or position by actuating one or more illumination and/or haptic elements of the other computing device; C) generating a reaction indicator, indicating the mapped user intent from the motion and/or position, within a text conversation, audio call, video call, or holographic call; or D) any combination thereof.

\* \* \* \* \*